United States Patent
Lev-Ran et al.

(10) Patent No.: US 9,154,557 B2
(45) Date of Patent: Oct. 6, 2015

(54) AUTOMATIC PROXY REGISTRATION AND DISCOVERY IN A MULTI-PROXY COMMUNICATION SYSTEM

(75) Inventors: Etai Lev-Ran, Sunnyvale, CA (US); Leonid Vasetsky, Haifa (IL); Daniel Kaminsky, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1987 days.

(21) Appl. No.: 11/580,739

(22) Filed: Oct. 12, 2006

(65) Prior Publication Data
US 2008/0091812 A1    Apr. 17, 2008

(51) Int. Cl.
G06F 15/16 (2006.01)
H04L 29/08 (2006.01)
H04L 29/12 (2006.01)
G06F 17/30 (2006.01)

(52) U.S. Cl.
CPC .......... *H04L 67/16* (2013.01); *H04L 29/12169* (2013.01); *H04L 61/1576* (2013.01); *H04L 67/28* (2013.01); *H04L 67/288* (2013.01); *G06F 17/30194* (2013.01); *H04L 67/101* (2013.01); *H04L 67/1002* (2013.01); *H04L 67/1012* (2013.01)

(58) Field of Classification Search
CPC .................................. G06F 17/30194
USPC ..................... 709/229, 218; 707/10
See application file for complete search history.

(56) References Cited

U.S. PATENT DOCUMENTS 6,324,581 B1* 11/2001 Xu et al. ................. 709/229
6,502,106 B1* 12/2002 Gampper et al. .......... 707/104.1
6,795,851 B1* 9/2004 Noy ....................... 709/218
2002/0099814 A1* 7/2002 Mastrianni ............. 709/224
2005/0086340 A1* 4/2005 Kang et al. ............. 709/224
2006/0136724 A1* 6/2006 Takeshima et al. ....... 713/168
2006/0168113 A1* 7/2006 Jung et al. ............... 709/218
2006/0282540 A1* 12/2006 Tanimoto ................ 709/228
2007/0055703 A1* 3/2007 Zimran et al. ............ 707/200
2007/0088702 A1* 4/2007 Fridella et al. ............. 707/10

(Continued)

OTHER PUBLICATIONS

Gauthier, Paul, et al., "Web Proxy Auto-Discovery Protocol", Internet-Draft, Standards Track, written Jul. 28, 1999, 19 pages.

(Continued)

*Primary Examiner* — Krista Zele
*Assistant Examiner* — James Forman
(74) *Attorney, Agent, or Firm* — Hickman Palermo Becker Bingham LLP (57) ABSTRACT

One embodiment comprises an apparatus for automatic proxy registration and discovery in a multi-proxy communication system. The apparatus executes a proxy server that is configured to provide optimized connections to remote proxy servers that are communicatively connected to the proxy server over a Wide Area Network (WAN). A file server, which is communicatively connected to the proxy server over a Local Area Network (LAN), is automatically discovered. An association record corresponding to the file server is created, where the association record identifies the file server and the proxy server and indicates that the proxy server is configured to provide the remote proxy servers with optimized connections to the file server. The association record is registered with a centralized database server, where the remote proxy servers are communicatively connected to the centralized database server over the WAN.

11 Claims, 5 Drawing Sheets

(56) References Cited

U.S. PATENT DOCUMENTS

2008/0046435 A1* 2/2008 Watson et al. .................. 707/10
2008/0072136 A1* 3/2008 Lotenberg ..................... 715/234
2008/0172488 A1* 7/2008 Jawahar et al. ............... 709/225
2015/0095820 A1* 4/2015 Fellman ........................ 715/765

OTHER PUBLICATIONS

Guttman, E., et al., "Service Location Protocol, Version 2", Network Working Group, RFC 2608, Standards Track, Jun. 1999, 49 pages.

Juniper, "WX Central Management System (CMS) Administrator's Guide", WX Application Acceleration Platforms, Release 5.4, part No. 530-016763-01, Copyright 2001-2006 Juniper Networks, Inc., pp. 1-2, 5-12, 107-109, 111-113, 132-133, 154-156, and 160-161.
Juniper, "WX/WXC Operator's Guide", WXOS Software for Application Acceleration Platforms, Release 5.4, Part No. 530-016768-01, Copyright 2006 Juniper Networks, Inc., pp. 1-2, 5-14, and 91-95.
Riverbed, "Steelhead Management Console User's Guide", Version 2.1, Oct. 2005, Riverbed Technology, Part No. PUB-00001-210, pp. 1-6, and 22-38.

* cited by examiner

AUTOMATIC PROXY REGISTRATION AND DISCOVERY IN A MULTI-PROXY COMMUNICATION SYSTEM

TECHNICAL FIELD

The present disclosure generally relates to network communications.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Distributed communication systems typically exhibit significant latency and performance degradation when clients access data resources that are located across a WAN in a remote LAN. In order to reduce the latency and improve performance, a distributed communication system may employ one or more proxy servers at the edges in each LAN at which that LAN is connected to the WAN. Such distributed communication system is referred to herein as a "multi-proxy communication system".

In order to be able to establish optimized connections on behalf of their clients, proxy servers in a multi-proxy communication system need to be aware of each other as well as of the resource servers to which each proxy server provides optimized access. In one approach, a network administrator may manually configure each proxy server in a multi-proxy communication system with the necessary information. This approach works relatively well in small systems. However, manually configuring proxy servers in a large multi-proxy communication system, which may include dozens of proxy servers and hundreds or even thousands of resource servers, is cumbersome, tedious, and error-prone.

BRIEF DESCRIPTION OF THE DRAWINGS

The techniques for automatic proxy registration and discovery described herein are illustrated by way of example, and not by way of limitation, in the figures of the accompanying drawings and in which like reference numerals refer to similar elements and in which.

DESCRIPTION OF EXAMPLE EMBODIMENTS

Techniques for automatic proxy registration and discovery in a multi-proxy communication system are described. In the following description, for the purposes of explanation, numerous specific details are set forth in order to provide a thorough understanding of the present techniques. It will be apparent, however, to one skilled in the art that the present techniques may be practiced without these specific details. In other instances, well-known structures and devices are shown in block diagram form in order to avoid unnecessarily obscuring the present techniques.

Embodiments are described herein according to the following outline:

> 1.0 General Overview
> 2.0 Structural and Functional Overview
> 3.0 Automatic Proxy Registration and Discovery
>   3.1 Automatic Discovery of Resource Servers
>   3.2 Registration of Discovered Resource Servers
>   3.3 Using Automatic Proxy Registrations
> 4.0 Implementation Mechanisms - Hardware Overview
> 5.0 Extensions and Alternatives 1.0 General Overview The needs identified in the foregoing Background, and other needs and objects that will become apparent for the following description, are achieved by the present techniques, which comprise, in one embodiment, a method for automatic proxy registration and discovery in a multi-proxy communication system, the method comprising the steps of: executing a proxy server that is configured to provide optimized connections to remote proxy servers that are communicatively connected to the proxy server over a Wide Area Network (WAN); automatically discovering a file server that is communicatively connected to the proxy server over a Local Area Network (LAN); creating an association record corresponding to the file server, where the association record identifies the file server and the proxy server and indicates that the proxy server is configured to provide the remote proxy servers with optimized connections to the file server; and registering the association record with a centralized database server, where the remote proxy servers are communicatively connected to the centralized database server over the WAN.

In one feature of this embodiment, the file server is one of a plurality of file servers that are communicatively connected to the proxy server over the LAN. In this feature, the method further comprises the steps of: automatically discovering each of the plurality of file servers; creating a plurality of association records corresponding to the plurality of file servers, where each association record identifies a corresponding file server of the plurality of file servers and the proxy server and indicates that the proxy server is configured to provide the remote proxy servers with optimized connections to the corresponding file server; and registering each of the plurality of association records with the centralized database server.

In one feature of this embodiment, the method further comprises the steps of: prior to automatically discovering the file server, receiving from a remote proxy server a request to determine whether the proxy server is configured to provide optimized connections to the file server; and in response to receiving the request, performing the steps of automatically discovering the file server, creating the association record, and registering the association record with the centralized database server.

In one feature of this embodiment, the step of automatically discovering the file server further comprises the steps of: sending a request to determine a name of a site to which the file server belongs; receiving a response that includes the name of the site to which the file server belongs; based on the name of the site, determining whether the file server and the proxy server belong to the same site; and creating the association record and registering the association record with the centralized database server only when the file server and the proxy server belong to the same site.

In one feature of this embodiment, the association record further includes a proximity metric that indicates, at any given time, how fast any connection between the proxy server and the file server would be. In this feature, the method further comprises the steps of: periodically determining values of the proximity metric based on measurements reflecting the network load between the proxy server and the file server; and sending the values of the proximity metric to the centralized database server. The centralized database server is configured to periodically update the association record with the received values of the proximity metric and, based on a current value of the proximity metric, to periodically determine whether to deactivate the association record.

In one feature of this embodiment, the association record stores a first network name for the file server and a second network name for the proxy server.

In one feature of this embodiment, the centralized database server stores association records in any one of a Central Manager (CM) database, a Lightweight Data Access Protocol (LDAP) database, an Active Directory (AD) database, and a Domain Name Service (DNS) database.

In another embodiment, the present techniques comprise a method for using automatic proxy registrations in a multi-proxy communication system, the method comprising the steps of: executing a proxy server configured to provide optimized connections to one or more remote proxy servers that are communicatively connected to the proxy server over a WAN; receiving, from a client, a request to connect to a file server that is communicatively connected to the proxy server over the WAN, where the client is communicatively connected to the proxy server over a first LAN; determining a particular remote proxy server of the one or more remote proxy servers that is configured to provide an optimized connection to the file server, where the particular remote proxy server is communicatively connected to the file server over a second LAN; and the proxy server establishing, through the particular remote proxy server, the optimized connection between the client and the file server.

In one feature of this embodiment, the step of determining the particular remote proxy server further comprises the steps of: in response to receiving the request from the client, sending a query to a centralized database server, where the query includes information identifying the file server, and where the one or more remote proxy servers are communicatively connected to the centralized database server over the WAN; in response to the query, receiving at least one association record from the centralized database server, where the at least one association record indicates at least one remote proxy server that is configured to provide the optimized connection to the file server; and selecting the particular remote proxy server based on the at least one association record. In this feature, the method may further comprise the step of storing the at least one association record in a cache. When the method provides for storing the at least one association record in the cache, the method may further comprise the steps of: receiving, from a second client, a second request to connect to the file server; checking the cache to determine whether the cache stores any association records that indicate any remote proxy servers which are configured to provide a second optimized connection to the file server; locating the at least one association record in the cache; based on the at least one association record, determining that the particular remote proxy server of the one or more remote proxy servers is configured to provide the second optimized connection to the file server; and the proxy server establishing, through the particular remote proxy server, the second optimized connection between the second client and the file server.

In one feature of this embodiment, each of the at least one association record stores a first network name for the file server and a second network name for a corresponding remote proxy server of the one or more of remote proxy servers.

In one feature of this embodiment, the step of determining the particular remote proxy server further comprises the steps of: in response to receiving the request from the client, sending a query to a centralized database server, where the query includes information identifying the file server, and where the one or more remote proxy servers are communicatively connected to the centralized database server over the WAN; in response to the query, receiving a message from the centralized database server indicating that there are no association records that indicate any remote proxy servers configured to provide the optimized connection to the file server; and in response to receiving the message from the centralized database server, sending a discovery request to the one or more remote proxy servers, where the discovery request indicates the file server and instructs the one or more remote proxy servers to determine the nearest remote proxy server to the file server. In this feature, the method may further comprise the step of the proxy server establishing for the client a non-optimized connection directly to the file server in response to receiving the message from the centralized database server. When the proxy server establishes for the client the non-optimized connection directly to the file server, then (1) the step of determining the particular remote proxy server may further comprise the steps of: after sending the discovery request, receiving at least one association record from the centralized database server, where the at least one association record indicates the nearest remote proxy server that is configured to provide the optimized connection to the file server; and based on the at least one association record, selecting the nearest remote proxy server to the file server as the particular remote proxy server; and (2) the step of the proxy server establishing the optimized connection between the client and the file server may further comprise the steps of: after determining the particular remote proxy server, transparently disconnecting the non-optimized connection between the client and the file server; and after transparently disconnecting the non-optimized connection, transparently establishing the optimized connection between the client and the file server through the particular remote proxy server.

In another embodiment, the present techniques comprise a computer-readable medium carrying one or more sequences of instructions for automatic proxy registration and discovery in a multi-proxy communication system, which instructions, when executed by one or more processors, cause: executing a proxy server configured to provide optimized connections to remote proxy servers that are communicatively connected to the proxy server over a WAN; automatically discovering a file server that is communicatively connected to the proxy server over a LAN; creating an association record corresponding to the file server, where the association record identifies the file server and the proxy server and indicates that the proxy server is configured to provide the remote proxy servers with optimized connections to the file server; and registering the association record with a centralized database server, where the remote proxy servers are communicatively connected to the centralized database server over the WAN.

In another embodiment, the present techniques comprise a computer-readable medium carrying one or more sequences of instructions for using automatic proxy registrations in a multi-proxy communication system, which instructions, when executed by one or more processors, cause: executing a proxy server configured to provide optimized connections to one or more remote proxy servers that are communicatively connected to the proxy server over a WAN; receiving, from a client, a request to connect to a file server that is communicatively connected to the proxy server over the WAN, where the client is communicatively connected to the proxy server over a first LAN; determining a particular remote proxy server of the one or more remote proxy servers that is configured to provide an optimized connection to the file server, where the particular remote proxy server is communicatively connected to the file server over a second LAN; and causing the proxy server to establish, through the particular remote proxy server, the optimized connection between the client and the file server.

In another embodiment, the present techniques comprise an apparatus for automatic proxy registration and discovery in a multi-proxy communication system, the apparatus comprising one or more processors and a computer-readable storage medium comprising one or more sequences of instructions. The one or more sequences of instructions, when executed by the one or more processors, cause: executing a proxy server configured to provide optimized connections to remote proxy servers that are communicatively connected to the proxy server over a WAN; automatically discovering a file server that is communicatively connected to the proxy server over a LAN; creating an association record corresponding to the file server, where the association record identifies the file server and the proxy server and indicates that the proxy server is configured to provide the remote proxy servers with optimized connections to the file server; and registering the association record with a centralized database server, where the remote proxy servers are communicatively connected to the centralized database server over the WAN.

In another embodiment, the present techniques comprise an apparatus for using automatic proxy registrations in a multi-proxy communication system, the apparatus comprising one or more processors and a computer-readable storage medium comprising one or more sequences of instructions. The one or more sequences of instructions, when executed by the one or more processors, cause: executing a proxy server configured to provide optimized connections to one or more remote proxy servers that are communicatively connected to the proxy server over a WAN; receiving, from a client, a request to connect to a file server that is communicatively connected to the proxy server over the WAN, where the client is communicatively connected to the proxy server over a first LAN; determining a particular remote proxy server of the one or more remote proxy servers that is configured to provide an optimized connection to the file server, where the particular remote proxy server is communicatively connected to the file server over a second LAN; and causing the proxy server to establish, through the particular remote proxy server, the optimized connection between the client and the file server.

In another embodiment, the present techniques comprise an apparatus for automatic proxy registration and discovery in a multi-proxy communication system, the apparatus comprising: means for executing a proxy server configured to provide optimized connections to remote proxy servers that are communicatively connected to the proxy server over a WAN; means for automatically discovering a file server that is communicatively connected to the proxy server over a LAN; means for creating an association record corresponding to the file server, where the association record identifies the file server and the proxy server and indicates that the proxy server is configured to provide the remote proxy servers with optimized connections to the file server; and means for registering the association record with a centralized database server, where the remote proxy servers are communicatively connected to the centralized database server over the WAN.

In another embodiment, the present techniques comprise an apparatus for using automatic proxy registrations in a multi-proxy communication system, the apparatus comprising: means for executing a proxy server configured to provide optimized connections to one or more remote proxy servers that are communicatively connected to the proxy server over a WAN; means for receiving, from a client, a request to connect to a file server that is communicatively connected to the proxy server over the WAN, where the client is communicatively connected to the proxy server over a first LAN; means for determining a particular remote proxy server of the one or more remote proxy servers that is configured to provide an optimized connection to the file server, where the particular remote proxy server is communicatively connected to the file server over a second LAN; and means for causing the proxy server to establish, through the particular remote proxy server, the optimized connection between the client and the file server.

In other embodiments, the present techniques comprise a multi-proxy communication system that comprises proxy servers that include the foregoing features and that are operable to perform the foregoing steps.

Embodiments of the present techniques for automatic proxy registration and discovery in multi-proxy communication systems may be implemented using one or more computer programs executing on network infrastructure elements that are established in packet-switched networks. Thus, in some embodiments the present techniques can be implemented on a router or on a switch. In other embodiments, the present techniques may be implemented on network devices that are communicatively connected to network infrastructure elements, such as, for example, routers or switches.

2.0 Structural and Functional Overview

Example Operational Context

In a multi-proxy communication system, two proxy servers in remote LANs may be configured to employ various techniques to improve the performance and reduce the latency for their respective clients and servers that communicate over a WAN. For example, when a client in a first LAN wants to access a file server in a remote second LAN, a proxy server in the first LAN may establish an optimized Transmission Control Protocol (TCP) connection to the file server through a proxy server in the remote LAN. (The proxy server in the first LAN that services the access request from the client may also be referred to as a "client-side" proxy server; the proxy server in the remote second LAN that provides the optimized TCP connection to the file server may be referred to as a "server-side" proxy server.) As part of establishing a TCP session, the client sends a TCP SYN segment to the file server. The client-side proxy server (which is local to the client) intercepts the SYN segment and stores a TCP option value in the segment indicating that the proxy server would like to optimize the TCP connection over the WAN on behalf of the client. The client-side proxy server then sends the modified SYN segment across the WAN to the target file server. Suppose that at the remote LAN, the SYN segment is intercepted and examined by a proxy server that functions as a server-side proxy for the target file server. The server-side proxy server detects the TCP option and thereafter sends the SYN segment to the target file server. In response, the target file server responds with a TCP SYN-ACK segment. The server-side proxy server intercepts the response SYN-ACK segment and stores therein a TCP option value indicating that it is capable of optimizing this TCP connection to the target file server over the WAN. The server-side proxy server then sends the response SYN- ACK segment across the WAN to the client. The client-side proxy server intercepts the response SYN-ACK segment and determines, based on the TCP option value included therein, that it now can optimize the TCP connection between the client and the target file server through the server-side proxy server. In this way, the client-side proxy server and the server-side proxy server can auto-discover each other on a connection-by-connection basis. However, this connection-by-connection auto-discovery mechanism does not work when for whatever reason a client-side proxy server and a server-side proxy server cannot communicate with each other at the time a client attempts to establish a connection to a remote resource server (e.g. when the communication path between the client-side proxy server and the server-side proxy server includes a firewall that strips TCP options from TCP segments).

Figure 1:
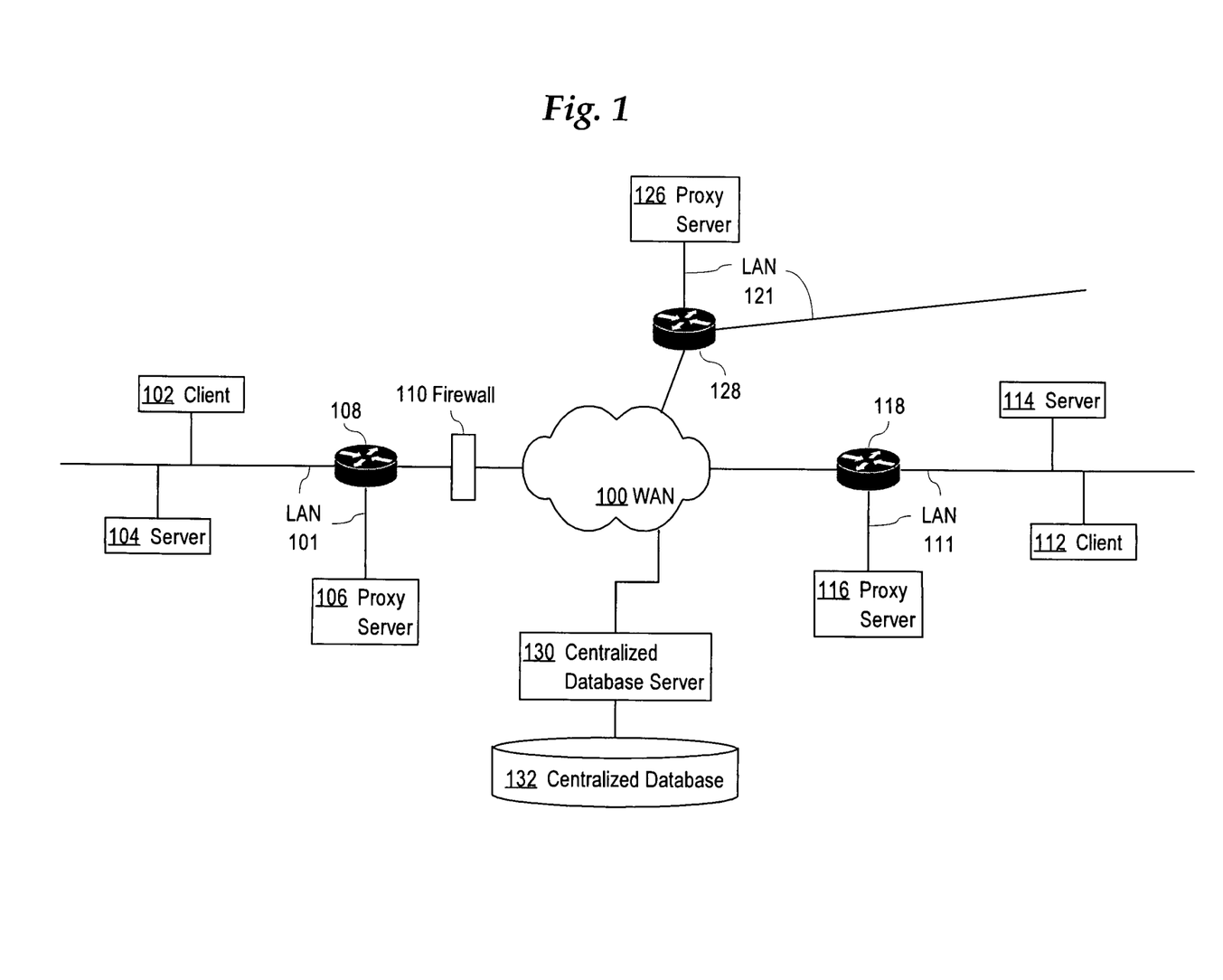
FIG. 1 illustrates an example operational context.

FIG. 1 illustrates an example operational context in which an embodiment addressing the issue with the above connection-by-connection auto-discovery mechanism may be implemented. The example operational context of FIG. 1 includes a multi-proxy communication system that encompasses Local Area Networks (LANs) 101, 111, and 121, which are communicatively connected over Wide Area Network (WAN) 100.

LAN 101 is communicatively connected to WAN 100 through router 108, where firewall 110 is coupled to router 108 and is operable to perform one or more firewall functions on the communication path between LAN 101 and WAN 100. One or more clients, such as client 102, and/or one or more servers, such as server 104, may be established in LAN 101. The clients in LAN 101 may be any type of clients that are utilized by application programs and/or users to access any type of local or remote resources, such as, for example, resources provided by local or remote servers. Examples of clients include, but are not limited to, file system drivers and software and/or hardware clients for various applications and services. The servers in LAN 101 may be any type of servers operable to provide resources including, but not limited to, file servers, Database Management System (DBMS) servers, and Web servers.

Similarly, LAN 111 is communicatively connected to WAN 100 through router 118. One or more clients, such as client 112, and one or more servers, such as server 114, are established in LAN 111. The clients in LAN 111 may be any type of clients that are utilized by application programs and/or users to access any type of local or remote resources, such as, for example, resources provided by local or remote servers. The servers in LAN 111 may be any type of servers operable to provide resources including, but not limited to, file servers, DBMS servers, and Web servers. Similarly to LANs 101 and 111, LAN 121 is communicatively connected to WAN 100 through router 128. One or more clients (not shown) and one or more servers (not shown) may also be established in LAN 121.

As used herein, "server" refers to a combination of software components and an allocation of computational resources, such as memory and one or more processors, where the one or more processors execute the software components, and where the combination of the software components and the computational resources are dedicated to providing a particular type of function on behalf of clients of the server. As used herein, a "proxy" server is a server that is operable to provide local clients with access to remote servers and/or to provide remote clients with access to local servers. For example, in some embodiments, a proxy server in a multi-proxy communication system may perform as a client-side proxy server for outbound requests from local clients. In other embodiments, a proxy server may perform as a server-side proxy for inbound requests to local servers. In yet other embodiments, a proxy server may perform as a client-side proxy server for outbound requests from local clients and simultaneously may perform as a server-side proxy server for inbound requests to local servers.

Router 108 in LAN 101 is communicatively and/or operatively coupled to proxy server 106. In some embodiments, proxy server 106 may execute on the same hardware platform as router 108. In other embodiments, proxy server 106 may execute on a hardware platform that is separate from router 108. Similarly, router 118 in LAN 111 is communicatively and/or operatively coupled to proxy server 116, and router 128 in LAN 121 is communicatively and/or operatively coupled to proxy server 126.

In the multi-proxy communication system of FIG. 1, router 108 is configured to redirect through proxy server 106 some or all of the network traffic from LAN 101 to WAN 100 and from WAN 100 to LAN 101. For example, router 108 may redirect through proxy server 106 any requests sent over WAN 100 to servers local to LAN 101, such as, for example, server 104. Router 108 may also redirect through proxy server 106 any requests from local clients that are sent over WAN 100 to remote servers, such as, for example, server 114 in LAN 111. In a similar manner, router 118 may be configured to redirect through proxy server 116 some or all of the network traffic from LAN 111 to WAN 100 and from WAN 100 to LAN 111, and router 128 may be configured to redirect through proxy server 126 some or all of the network traffic from LAN 121 to WAN 100 and from WAN 100 to LAN 121.

The example operational context of FIG. 1 also includes centralized database server 130, which is communicatively and/operatively coupled to centralized database 132. For illustration purposes, in FIG. 1 centralized database server 130 is depicted in general as being communicatively connected to WAN 100. In various embodiments however, a centralized database server may be established in any of the LANs encompassed by a multi-proxy communication system. As long as the proxy servers in the multi-proxy communication system are configured to know the location (e.g. the network address) of the centralized database server and are capable of storing and querying the information managed by the database server in a centralized database, the techniques described herein are not restricted to any particular location or network in which a centralized database server may reside. For this reason, the depiction of centralized database server 130 as being communicatively connected to WAN 100 is to be regarded in an illustrative rather than a restrictive sense.

According to the techniques for automatic proxy registration and discovery described herein, centralized database server 130 is operable to receive, from any proxy server in the multi-proxy communication system depicted in FIG. 1, registration information which identifies that particular proxy server and one or more servers for which the particular proxy server is configured to provide optimized connections over WAN 100. For example, centralized database server 130 may receive an association record from proxy server 116, where the association record identifies and binds together proxy server 116 and server 114, and where the association record indicates that proxy server 116 is configured to provide optimized connections over WAN 100 for any remote clients that request to access server 114. (As used herein, an "association record" refers to a data structure that comprises information identifying a resource server and information identifying a proxy server that is operable to provide optimized connections to the resource server identified in the record.) Centralized database server 130 is also operable to store the registration information in centralized database 132, and to provide this registration information in response to queries from any proxy server in the system. For example, when proxy server 106 in LAN 101 intercepts a request sent from local client 102 to server 114 (located in LAN 111), proxy server 106 sends a query to centralized database server 130 to determine whether centralized database 132 stores any registration information that indicates a proxy server capable of providing optimized connections to server 114. In response to the query, centralized database server 130 provides proxy server 106 with the association record received from proxy server 116. Based on the association record, proxy server 106 determines that proxy server 116 is configured to provide optimized connections over WAN 100 for requests sent to server 114. Thereafter, proxy server 106 may establish, over WAN 100 and through proxy server 116, an optimized connection between its local client 102 and the remote server 114.

Optimized Connections

As used herein, "optimized connection" refers to a connection provided by two entities that is specifically configured by the two entities for improved performance. For example, according to the techniques for automatic proxy registration and discovery described herein, in one embodiment a client-side proxy server in a multi-proxy communication system is operable to establish, through a server-side proxy server, an optimized connection over a WAN between a client local to the client-side proxy server and a server local to the server-side proxy server. The portion of the connection over the WAN between the client-side proxy server and the server-side proxy server may be optimized by using a variety of mechanisms to reduce the used bandwidth and to improve the performance and the overall response times.

The techniques for automatic proxy registration and discovery described herein are not limited to being implemented with respect to any particular type of optimizable connections. For example, in some embodiments the optimized connection provided by two proxy servers-may be a transport protocol connection, such as, for example, a TCP session, a Stream Control Transmission Protocol (SCTP) association, a User Datagram Protocol (UDP) connection, and a Datagram Congestion Control Protocol (DCCP) connection. In other embodiments, the optimized connection established between two proxy servers may be a client-server connection established over any session, presentation, and/or application protocol that is at a higher level in the communication stack than the transport protocol level. Examples of such higher-level protocols include, but are not limited to, the Common Internet File System (CIFS) protocol, the Server Message Block (SMB) protocol, the Network File System (NFS) protocol, the Remote Procedure Call (RPC) protocol, the RealTime Streaming Protocol (RTCP) protocol, the Realtime Transport Protocol (RTP), the Simple Mail Transfer Protocol (SMTP), the Simple Network Management Protocol (SNMP), the Domain Name Service (DNS) protocol, the Post Office Protocol version 3 (POP3), the Internet Message Access Protocol (IMAP), the HyperText Transfer Protocol (HTTP), and the File Transfer Protocol (FTP).

In addition, the techniques for automatic proxy registration and discovery described herein may be implemented in conjunction with any mechanisms or systems that provide for optimizing communications over slow and/or low-bandwidth communication links, such as WAN links, dial-up links, Digital Subscriber Lines (DSLs), and Integrated Services Digital Network (ISDN) links. For example, in one embodiment the client-side proxy server and the server-side proxy server may utilize a compression mechanism to reduce the amount of data transmitted over a (typically) low-bandwidth WAN. In another embodiment, the techniques described herein may be implemented in conjunction with clients and servers of a distributed file system, such as, for example, the Low Bandwidth network File System (LBFS).

Thus, the techniques for automatic proxy registration and discovery described herein may be implemented in conjunction with a wide variety of protocols and mechanisms that provide a wide variety of optimized connections. For this reason, the examples of optimized connections described in this disclosure are to be regarded in an illustrative rather than a restrictive sense.

Functional Overview

Figure 2:
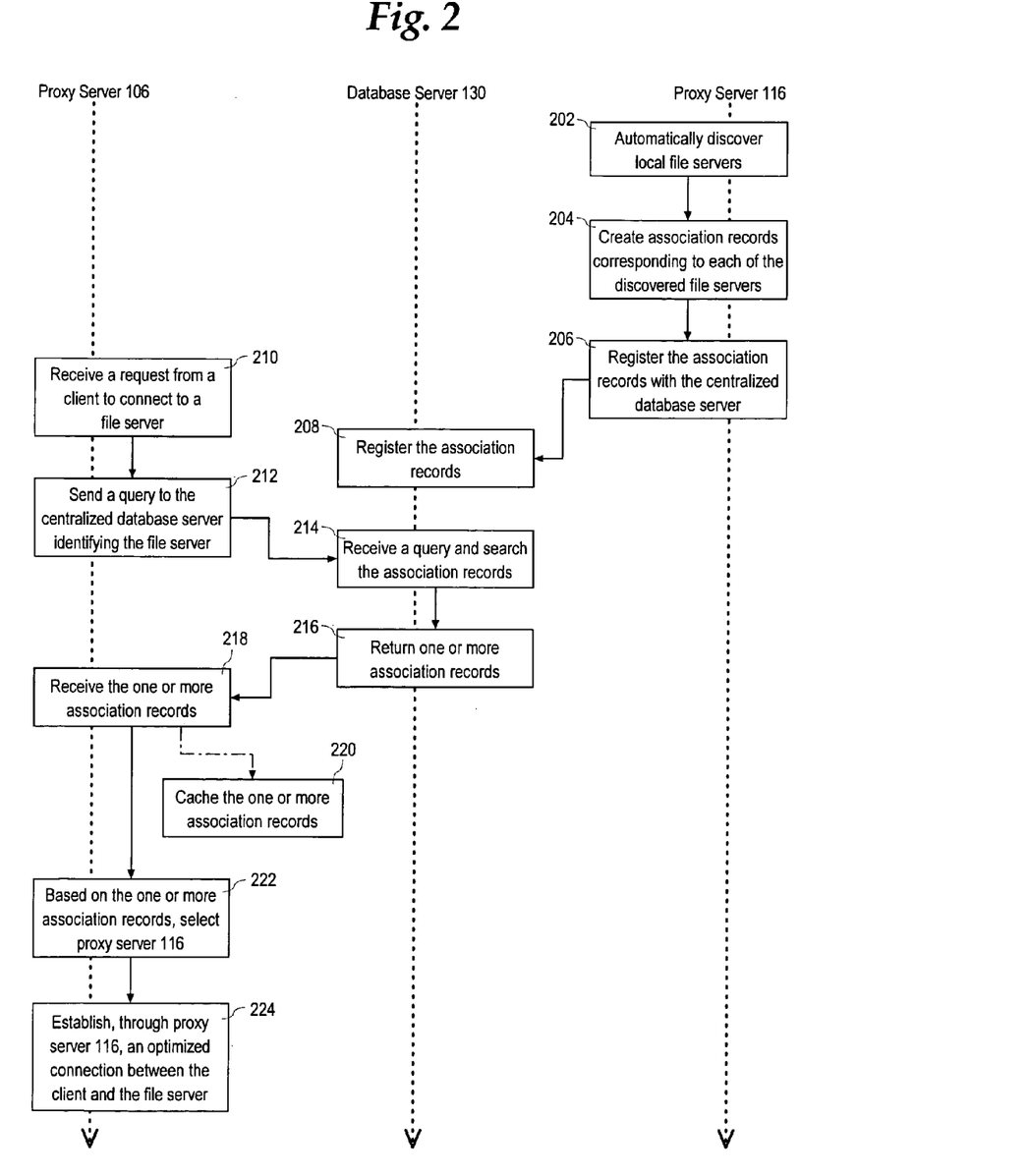
FIG. 2 illustrates one embodiment of a method for automatic proxy registration and discovery and for using automatic proxy registrations in a multi-proxy communication system.

FIG. 2 is a flow diagram that illustrates a high level overview of one embodiment of a method for automatic proxy registration and discovery and for using automatic proxy registrations in a multi-proxy communication system, such as the multi-proxy communication system illustrated in FIG. 1.

In step 202, server-side proxy server 116 automatically discovers its local resource servers. For example, server-side proxy server 116 may use the Microsoft Windows® Browser protocol to discover the network name and/or network address of a file server, such as, for example, server 114. In step 204, server-side proxy server 116 creates one or more association records corresponding to each of the one or more local servers that are discovered (including file server 114). Each association record identifies server-side proxy server 116 and a corresponding discovered local server, and indicates that the server-side proxy server is configured to provide other remote proxy servers in the system with optimized connections to that local server. In step 206, server-side proxy server 116 registers the one or more association records with centralized database server 130.

In step 208, centralized database server 130 receives the one or more association records from proxy server 116, and registers the association records in centralized database 132. Thereafter, centralized database server 130 is operable to query the centralized database in response to requests sent from any proxy server in the system. For example, a typical query from a proxy server would include information identifying a particular resource server; in response to the query, centralized database server 130 would return to the requesting proxy server all association records that identify that particular resource server, where the association records would also indicate the proxy server or servers that are configured to provide optimized connections to that particular resource server.

For example, suppose that in step 210, client-side proxy server 106 receives from a local client (e.g. client 102) a request to connect to file server 114. Suppose also that client-side proxy server 106 uses a cache to store association records previously retrieved from centralized database server 130. In response to the request from the local client, client-side proxy server 106 first checks the cache to determine whether the cache stores any association records that indicate any remote proxy servers which are configured to provide optimized connections to file server 114. If client-side proxy server 106 locates at least one such association record in the cache, the client-side proxy server may establish, on behalf of the client, an optimized connection to server 114 through the remote proxy server identified in the located association record. Suppose, however, that client-side proxy server 106 does not find any association records in the cache that match on the identity of the target file server 114. In this case, in step 208, client-side proxy server 106 sends a query to centralized database server 130, where the query includes information (e.g. a network name and/or a network address) that identifies file server 114.

In step 214, centralized database server 130 receives the query, and based on the information stored therein searches centralized database 132. The search will return at least one association record identifying file server 114, for example, the association record registered by server-side proxy server 116 (which association record identifies file server 114 and proxy server 116 and indicates that proxy server 116 is configured to provide optimized connections to file server 114.) In step 216, centralized database server 116 returns the retrieved one more association records to client-side proxy server 106.

In step 218, client-side proxy server 106 receives the one more association records from centralized database server 130. Client-side proxy server 106 then stores the one or more association records in the cache in step 220. In step 222, based on the one or more association records, client-side proxy server 106 determines that proxy server 116 is configured to provide optimized connections to file server 114; in this way, proxy server 116 is selected to provide an optimized connection to file server 114 in response to the request from the local client. Thereafter, in step 224, client-side proxy server 224 establishes, through proxy server 116, an optimized connection between the client and file server 114.

The above embodiment of the method for automatic proxy registration and discovery and for using automatic proxy registrations is described with respect to a file server for illustration purposes only. In other embodiments, the techniques for automatic proxy registration and discovery may be implemented for any type of resource servers including, but not limited to, DBMS servers and web servers. Further, while the above embodiment describes a server-side proxy server as registering association records and a client-side proxy server as using association records, the techniques described herein are not so limited. For example, in some embodiments, a proxy server may perform both the functions of a server-side proxy (for inbound requests to local servers) and a client-side proxy (for outbound requests from local clients); thus, in these embodiments, the proxy server would both register association records with a centralized database server and query the centralized database server to retrieve association records. For these reasons, the embodiment of the method for automatic proxy registration and discovery and for using automatic proxy registrations described above with respect to FIGS. 1 and 2 is to be regarded in an illustrative rather than a restrictive sense.

Figure 3A:
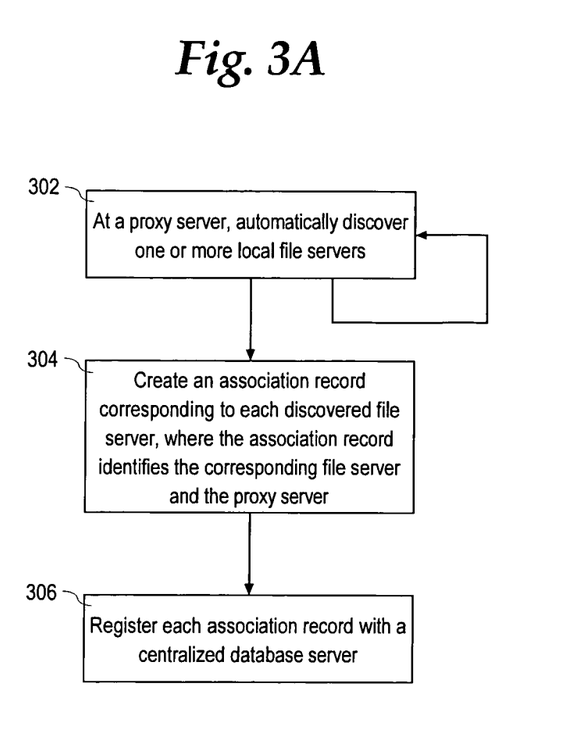
FIG. 3A illustrates one embodiment of a method for automatic proxy registration and discovery in a multi-proxy communication system.

3.0 Automatic Proxy Registration and Discovery 3.1 Automatic Discovery of Resource Servers FIG. 3A is a flow diagram that illustrates an overview of one embodiment of a method for automatic proxy registration and discovery in a multi-proxy communication system.

In step 302, a proxy server automatically discovers one or more file servers that are local to the proxy server. The proxy server may use a variety of protocols to perform automatic server discovery including, but not limited to, a NetBIOS name service protocol, a Microsoft Windows® Browser protocol, and a Service Location Protocol (SLP). In some embodiments, the proxy server may use recursive search algorithms to discover any and/or all of its neighboring file servers. An example of such recursive search algorithm is a Breadth-First Search (BFS) algorithm that uses a number of iterations or some other metrics as a stop condition.

In addition, in some embodiments the proxy server may perform automatic discovery of its neighboring servers on a periodic basis, for example, at predetermined time intervals. In other embodiments, the proxy server may perform automatic discovery of its neighboring servers on-demand, for example, in response to a request from a remote proxy server to determine whether a particular file server is located in the vicinity of the proxy server. As part of the automatic discovery, the proxy server may determine the network addresses (e.g. IP addresses) and/or the logical network names of the local file servers.

In step 304, the proxy server creates an association record corresponding to each discovered file server. Each created association record identifies a corresponding file server and the proxy server. In some embodiments, an association record may identify the corresponding file server and the proxy server by using their network addresses and/or their logical network names.

In step 306, the proxy server registers each association record with a centralized database server, where the centralized database server is communicatively connected to the proxy server and to one or more other proxy servers. The centralized database server is operable to at least: store association records received from the proxy servers in a centralized database, search the centralized database in response to a query from any proxy server, and return to that proxy server any association records that are located during the search.

Auto-Discovery by Using a Microsoft Windows® Browser Protocol

In one embodiment, a proxy server may use a Microsoft Windows® Browser protocol to discover any resource servers which are in the vicinity of the proxy server and for which the proxy server may be operable to provide optimized connections to remote clients and servers. In this embodiment, the proxy server may first send a broadcast request to discover the Local Master Browser (LMB) and/or any Backup Browsers (BB) in its local subnet. Since there is at least one LMB per subnet, the broadcast request is answered with information identifying at least one LMB. The proxy server then sends a "QueryBrowseServers" or a "NetServerEnum" message to one of the located browsers—either an LMB or a BB. In response to this message, the proxy server receives a list of browsers in a specified group or domain, where domain name may be NetBIOS name. (To determine a specific group or domain, the proxy server may send a "NetServerEnum2" message, which returns a list of workgroups and domains; thereafter, the proxy server may query, one-by-one, the LMBs or BBs associated with each workgroup or domain.) The proxy server may also perform a recursive search against a series of LMBs if searching a single LMB would not determine all file servers that are in the vicinity of the proxy server.

After determining the LMBs and/or BBs for the workgroups and domains in its vicinity, the proxy server may recursively and/or iteratively query the located LMB (or a series of LMBs) to obtain the list of all neighboring servers along with their server types. Examples of types of servers that may be discovered through an LMB include, but are not limited to, file servers, Dynamic Host Configuration Protocol (DHCP) servers, Domain Name Service (DNS) servers, Remote Procedure Call (RPC) servers, DBMS servers, and web servers. Typically, the list of servers provided by an LMB would also include the logical network names of the servers.

In some embodiments, in response to receiving the list of servers from the LMB, the proxy server may create association records corresponding to all servers included in the list. In other embodiments, the proxy server may select a set of servers for which to create association records based on the logical server names and/or the server types indicated in the list received from the LMB. For example, in some embodiments, the proxy server may create association records only for the file servers that are included in the list received from the LMB. After creating the association records, the proxy server may register the association records with the centralized database server.

On-Demand Discovery

In some embodiments, a proxy server may perform on-demand discovery of its neighboring servers. For example, the proxy server may receive a discovery request from a remote proxy server to determine whether a particular file server is located in the vicinity of the proxy server. In response to the request, the proxy server would perform automatic discovery and would determine whether the proxy server may provide optimized connections to that particular file server. If the proxy server determines that it is operable to provide optimized connections to that particular file server, then the proxy server creates an association record corresponding to that particular file server and registers the association record with a centralized database server. In addition, the proxy server may also directly notify the remote proxy server, which requested the on-demand discovery, that the proxy is operable to provide optimized connections to the particular file server.

An example operational scenario in which a proxy server may perform on-demand discovery may be as follows. Suppose that a client makes a request to connect to a particular file server in a remote LAN, and that the request is intercepted by a client-side proxy server established in the LAN local to the client. The client-side proxy server determines that it is not aware of any remote proxy servers that are operable to provide optimized connections to that particular file server. (For example, the client-side proxy server may not store in its local cache any association records that identify the particular file server.) The client-side proxy server then sends a query to a centralized database server to find out whether any remote proxy server has registered an association record identifying that particular file server. In response to the query, the centralized database server returns no association records that identify that particular file server. The client-side proxy server may then establish a non-optimized connection to the particular file server on behalf of the client. In addition, the client-side proxy server may broadcast a discovery request for the particular file server to all remote proxy servers of which the client-side proxy server is aware. (For example, the client-side proxy server may broadcast the discovery request to all remote proxy servers that are identified in any association records stored in the local cache of the client-side proxy server.) In response to receiving the discovery request, each remote proxy server performs a discovery procedure to determine whether the particular file server identified in the discovery request is proximate to that remote proxy server. Suppose that a specific remote proxy server determines that the particular file server is located nearby and that the specific remote proxy server is operable to provide optimized connections to the particular file server. The specific remote proxy server then creates an association record corresponding to the particular file server and registers this association record with the centralized database server. (In addition, the specific remote proxy server may send to the client-side proxy server a message, which indicates that the specific remote proxy server is operable to provide optimized connections to the particular file server.) Thus, in this operational scenario, the specific remote proxy server performs on-demand discovery, where the on-demand discovery is initiated by the discovery request sent by the client-side proxy server that has encountered an unregistered file server.

The above on-demand discovery mechanism may be used in conjunction with other features of the techniques for automatic proxy registration and discovery. For example, the above on-demand discovery mechanism may be utilized by all proxy servers in a multi-proxy communication system to initially populate a centralized database that is maintained by a centralized database server. The multi-proxy communication system starts with an empty centralized database. Whenever any client attempts to connect to any remote file server, that file server is discovered by at least one proxy server through the on-demand discovery mechanism, and a corresponding association record is registered with the centralized database server. Any subsequent requests from any client in the multi-proxy communication system to the same file server would be processed over optimized connections since at least one association record identifying the file server would already be registered with the centralized database server.

Site-Based Discovery

Some embodiments may provide a site-based discovery mechanism. In these embodiments, a proxy server may discover resources servers in its vicinity by using a site-based discovery mechanism that uses logical server names instead of network addresses. For example, by using such site-based discovery mechanism, a proxy server may be able to discover file servers that are located in a different subnet than the proxy server, where the different subnet may nevertheless be geographically and/or physically proximate to the proxy server. (Typically, there are no immediate network address bindings (e.g. IP address bindings) between servers in separate subnets; thus, a proxy server that uses address-based discovery mechanisms is not capable of discovering file servers that are located in a different subnet, even though that subnet may be geographically or physically proximate to the proxy server.)

In one embodiment, the site-based discovery mechanism may use a protocol that allows a proxy server to discover which resource servers are associated with which sites. For example, in one operational scenario, a proxy server may use an Active Directory protocol to discover the name of a site to which a particular file server belongs. The proxy server may run a site-discovery query against an Active Directory server by using the MSRPC request "GET_DFS_SITE_NAME", where the proxy server includes in the request information that identifies the particular file server. Alternatively, or in addition to, the proxy server may send a site-discovery request directly to the particular file server. In response to the site-discovery request, the Active Directory server (and/or the file server, if queried directly) returns the name of the site to which the particular file server belongs. If the proxy server matches the returned site name to the name of its own site, the proxy server may create an association record for the particular file server, and may register the association record with the centralized database server. In addition, in this operational scenario, a proxy server may use the site-based discovery mechanism to query the Active Directory and to determine any hierarchical relations that may exit between the proxy server and file servers that are located in any sites that are accessible by the proxy server. The site-based discovery mechanism described herein is useful in operational contexts in which many and dispersed file servers provide file access in a Distributed File System (DFS) environment.

Metrics-Based Discovery and Registration

Some embodiments may provide a metrics-based registration mechanism. In these embodiments, a proxy server may compute a proximity metric for a discovered resource server, and may use the proximity metric to determine whether to register an association record for that resource server with the centralized database server. (As used to herein, "proximity metric" refers to a characteristic that reflects how fast a network connection between a proxy server and a resource server would be.)

For example, the proximity metric may be the number of milliseconds that it takes a proxy server to connect to a particular file server. A proxy server may determine this proximity metric by taking one or more measurements that reflect the network load between the proxy server and a particular file server. For instance, the proxy server may ping the particular file server one or more times in a short time-span, and may take the average response time of all pings as the value of the proximity metric. If the value of the proximity metric is greater than, for example, "N" milliseconds (where "N" may be a predetermined threshold number that indicates the number of milliseconds it should take the proxy server to connect to the particular file server), then the proxy server does not create and register an association record with the centralized database server because an optimized connection through the proxy server to the particular file server will be slow.

In one embodiment, the proxy server may use the value of a proximity metric associated with a particular resource server to determine whether to register an association record for that resource server.

In another embodiment, after computing the proximity metric for a resource server, the proxy server may include the computed value of the proximity metric as a separate field in the association record that the proxy server creates for that resource server. The proxy server may then send the association record to a centralized database server. In this embodiment, the decision whether to register the association record is made by the centralized database server. For example, the centralized database server may include logic for comparing the proximity metric value included in the association record with some pre-determined or pre-configured threshold value and logic for deciding, based on the result of the comparison, whether to register the association record.

In one embodiment, a proxy server may initially register an association record for a particular resource server. Thereafter, the proxy server may periodically determine a current value of a proximity metric associated with that particular resource server and may periodically report this current proximity metric value to the centralized database server. In this embodiment, when the centralized database server receives the current value of the proximity metric, the centralized database server may compare this current value to a pre-configured threshold value. Based on the result of the comparison, the centralized database server may determine whether the association record registered for the particular resource server is valid. For example, if the current value of the proximity metric received from the proxy server exceeds the pre-configured threshold value, the centralized database server may remove the association record from the centralized database and may designate an association record received from another proxy server as the association record to be returned in response to queries for that particular resource server. In another example, if the current value of the proximity metric exceeds the pre-configured threshold value, the centralized database server may deactivate the association record (by, for example, updating a field in the association record which field indicates whether the association record is valid.) Subsequently, when the centralized database server receives a current value of the proximity metric that does not exceed the threshold value, the centralized database server may activate the association record (by, for example, updating the corresponding field accordingly.)

3.2 Registration of Discovered Resource Servers

The techniques for automatic proxy registration and discovery and for using automatic proxy registrations described herein provide for a centralized database server that is operable to at least: store association records received from proxy servers in a centralized database, search the centralized database in response to a query from a proxy server, and return to a proxy server any association records that are found during the search. According to the techniques described herein, an association record comprises information which identifies a particular resource server and a proxy server and which indicates that the identified proxy server is operable to provide optimized connections to the identified resource server. The centralized database server is operable to store the received association records in a centralized database and to search the database for association records in response to queries from proxy servers. A query sent to the centralized database server may include information identifying a particular resource server (for example, a particular file server); in response to the query, the centralized database server searches the centralized database and returns all association records that identify that particular resource server.

In some embodiments, a centralized database server may store association records in a database or databases of any type including, but not limited to, a Central Manager database (provided by Cisco Systems, Inc. of San Jose, Calif.), an LDAP database, an Active Directory database, and a DNS database. In these embodiments, the centralized database server may be operable to receive and service requests and queries that are received over a variety of protocols including, but not limited to, an LDAP protocol, an Active Directory protocol, and a DNS protocol.

In some embodiments, a centralized database server may store association records in any proprietary or commercially available databases. In these embodiments, the centralized database server may be a DBMS server, such as for example, an Oracle RDBMS server, a Microsoft SQL Server, and a Sybase SQL Server. Alternatively, in these embodiments the centralized database server may query a DBMS server through an interface provided by the DBMS server (for example, an Open DataBase Connectivity (ODBC) interface), where the DBMS server would manage the centralized database that stores the association records and would respond to database queries that are received from the centralized database server.

In some embodiments, a centralized database server may store association records in databases over protocols that support built-in replication and client-side caching. Examples of such protocols include, but are not limited to, LDAP and DNS. In these embodiments, a centralized database server may use the replication and/or caching features provided by the particular protocol to maintain copies of the centralized database (or any portion or portions thereof) at the network devices that execute the proxy servers. Thus, in these embodiments, a proxy server may query a local copy of the centralized database for association records instead of sending queries to the centralized database server over possibly slow communication links.

The techniques for automatic proxy registration and discovery and for using automatic proxy registrations described herein are not limited to any particular type of centralized database server or any particular type of a centralized database for storing and managing association records created by proxy servers. For this reason, the centralized database servers and centralized databases described herein are to be regarded in an illustrative rather than a restrictive sense.

Storing Metric and Weight Information in Association Records

In some embodiments, in addition to including information identifying a resource server and a proxy server, an association record may also include metric values that indicate how close the proxy server is to the resource server. Examples of such metrics include, but are not limited to, one or more IP addresses (of the proxy server, resource server, or both) for proximity resolution based on subnets, average ping time, amount of consumed bandwidth on the communication bath between the proxy server and the resource server, and the name of the site or sites to which the proxy server and the resource server belong. In addition, a centralized database server may also store in the centralized database a mapping for all resource servers and/or name-based filters indicating that association records for certain resource servers should never be registered.

In some embodiments, a centralized database server may assign weights to proxy server identified in association records that the centralized database server stores in a centralized database. For example, in one embodiment, there may be multiple proxy servers that are operable to provide optimized connections to a particular file server. In this embodiment, a centralized database server may assign the same weight to all of the multiple proxy servers as a cluster, and may store this weight in all the association records for the particular file server that are received from each of the multiple proxy servers. In another embodiment, the centralized database server may store different weights in association records based on the capacity of the proxy servers identified in the records. In this embodiment, the weights stored in the association records may be returned along with the records in response to a query from a client-side proxy server, and the client-side proxy server may select, based on the returned weights, through which proxy server to establish an optimized connection to a particular file server. In another embodiment, the centralized database server may assign weights to proxy servers based on the current load of the proxy servers. In this embodiment, a proxy server and a centralized database server may periodically communicate (where the communications may be initiated by either or both of the proxy server and the centralized database server) and exchange information for the purpose of allowing the centralized database server to increase or decrease the weight assigned to the proxy server, so that at any given time a client-side proxy server would be able to select a less-loaded proxy server for establishing an optimized connection to a particular file server.

Storing State Information in Association Records

In some embodiments, a centralized database server may keep a state for each association record that is received from a proxy server. For example, in one embodiment, a centralized database server may store active association records in a first storage area (e.g. a first table) and inactive, or "dormant", association records in a second storage area (e.g. a second table). In this embodiment, the centralized database server may move an association record from the first storage area to the second storage area, or vice versa, when the state of the association record changes in response to the occurrence of a particular event. In another embodiment, a centralized database server may maintain the state of each association record in a separate field (e.g. a "status" field) that is stored in the record. In this embodiment, the centralized database server may maintain a plurality of states for each association record by updating the value of the "status" field accordingly.

In one embodiment, a centralized database server may provide logic for activating association records in response to input from an administrator. For example, a centralized database server may place a newly-received association record in an "inactive" state and may send a notification to an administrator that a new association record has been received. Thereafter, the administrator may review the association record and may change its status in the centralized database; for example, the administrator may activate the association record or may place the association record in a "never-activate" state (or place the record on a "never-activate" list) in order to prevent this association record from ever becoming active.

3.3 Using Automatic Proxy Registrations

Figure 3B:
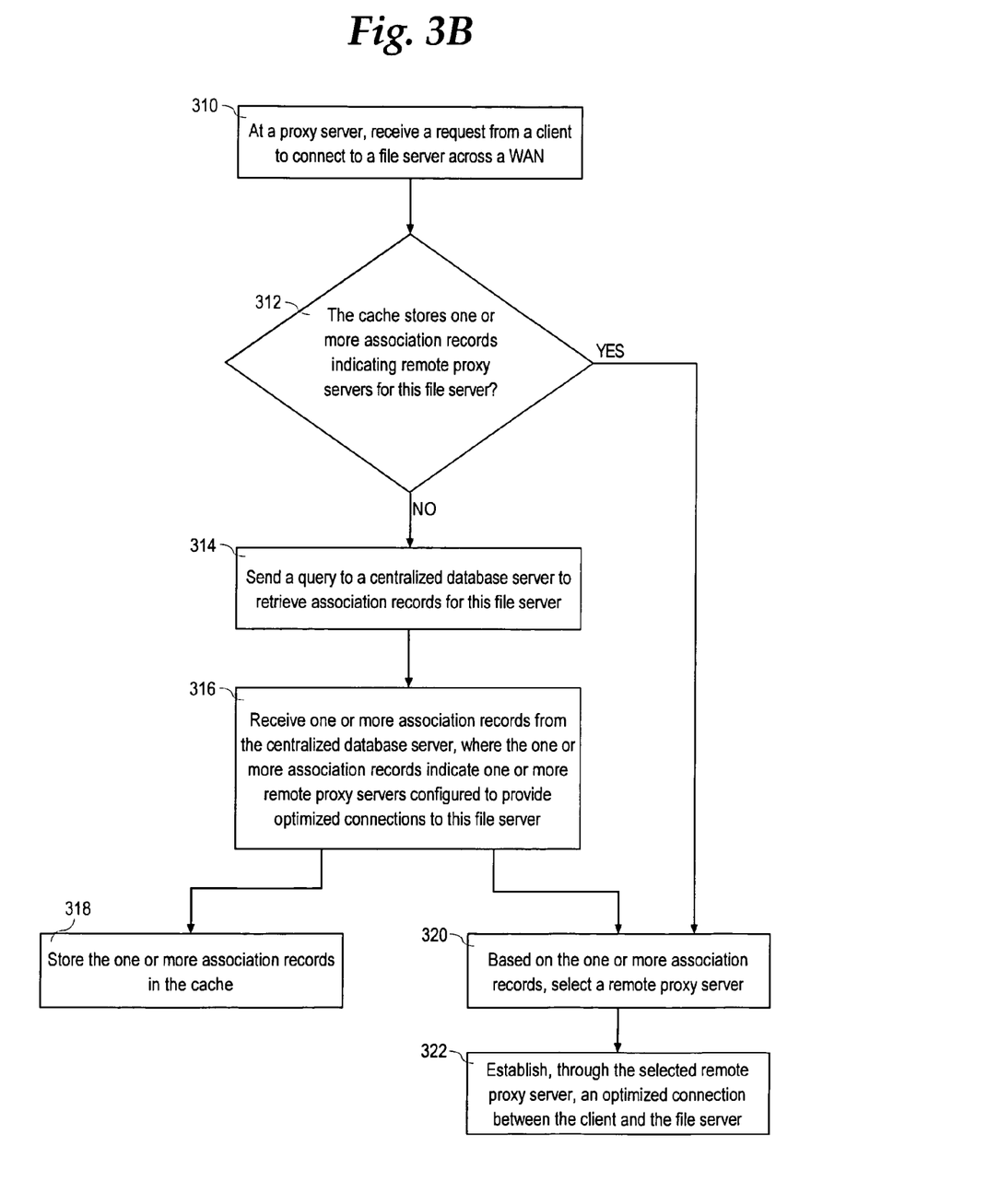
FIG. 3B illustrates one embodiment of a method for using automatic proxy registrations in a multi-proxy communication system.

FIG. 3B is a flow diagram that illustrates an overview of one embodiment of a method for using automatic proxy registrations in a multi-proxy communication system.

In step 310, a proxy server (e.g. a client-side proxy server) receives a request from a client to connect to a remote file server. For example, the client may be located in a first LAN and the remote file server may be located in a second LAN across a WAN. The proxy server may receive the request directly from the client (for example, if the client is aware of the network address of the proxy server in the local LAN, the client may send the request directly to the proxy server); alternatively, the proxy server may intercept the request from the client at a network infrastructure device (e.g. a router) that is operable to route requests from local clients to remote servers.

In step 312, the proxy server checks a local cache to determine whether the cache stores any association records that identify any remote proxy servers that are operable to provide optimized connections to the requested remote file server. If the proxy server locates one or more association records in the cache, then in step 320 the remote proxy server selects a remote proxy server based on the one or more association records.

If in step 312 the proxy server either (1) fails to find in the cache any association records that identify a remote proxy server for the requested file server, or (2) attempts but fails to establish an optimized connection to the requested file server through a remote proxy server that was selected based on an association record stored in the cache, then in step 314 the proxy server sends a query to a centralized database server in order to find a remote proxy server that is operable to provide optimized connections to the requested file server. The query may include information identifying the requested file server (e.g. the network name of the file server), and this information may be used by the centralized database server to search a centralized database of association records for any records that identify the requested file server. In response to the query, in step 316 the proxy server may receive one or more association records from the centralized database server, where the one or more received association records may identify one or more proxy servers that are operable to provide optimized connections to the requested file server.

In step 318, the proxy server may store the one or more received association records in the local cache. In this way, in response to subsequent requests for the requested file server (which requests may be sent either from the same or from a different client), the proxy server would be able to find in the local cache at least one association record that identifies a remote proxy server that is operable to provide optimized connections to that file server. In some embodiments, the proxy server may use one or more cache management mechanisms to maintain the association records in the cache current. For example, the proxy server may periodically run an algorithm to purge association records with expired "time-to-live" timestamps. In addition, in some embodiments, a proxy server may keep in the local cache a subset of the association records that are registered with the centralized database server; in other embodiments (for example, embodiments which use a relatively small association records database), the proxy server may store in the local cache the entire database of association records that are registered with the centralized database server.

After step 316, the proxy server proceeds in step 320 to select a remote proxy server based on the one or more association records that are received from the centralized database server. In step 322, the proxy server establishes, through the selected remote proxy server, an optimized connection to the requested file server on behalf of the client.

Establishing Optimized Connections in a Transparent Manner

In some embodiments, after a client-side proxy server fails to find in the cache any association records identifying a particular file server and after the client-side proxy server sends a query to a centralized database server, the client-side proxy server may receive a message indicating that the centralized database server failed to find any association records that identify any remote proxy servers that are operable to provide optimized connections to the particular file server. In these embodiments, the client-side proxy server may hold off the establishing of an optimized connection for the client until a suitable remote proxy server is found. The client-side proxy server may send a discovery request to some or all of its known remote proxy servers instructing them to discover the particular file server. Thereafter, in response to the discovery request, the client-side proxy server may receive (from the centralized database server and/or from at least one remote proxy server) one or more association records identifying one or more remote proxy servers that are operable to provide optimized connections to the particular file server. After receiving the one or more association records, the proxy server may select one remote proxy server and may establish an optimized connection to the particular file server through that particular remote proxy server.

In other embodiments, when the client-side proxy server cannot locate any association records in the local cache and when the client-side proxy server receives a message indicating that the centralized database server could not find any association records that identify any remote proxy servers that are operable to provide optimized connections to a requested remote file server, the client-side proxy server may immediately establish on behalf of the client a non-optimized connection to the requested file server. Thereafter, the client-side proxy server may determine a remote proxy server that is operable to provide optimized connections to the requested file server. For example, in response to a discover request, the client-side proxy server may receive one or more association records identifying one or more remote proxy servers that are operable to provide optimized connections to the requested file server. The client-side proxy server may then cache the received one or more association records and, based on the records, may select a particular remote proxy server through which to establish an optimized connection to the requested file server.

After the client-side proxy server selects the particular remote proxy server, the client-side proxy server may commence monitoring the communication stream exchanged over the non-optimized connection between the client and the requested file server. At a suitable point in the communication stream, the client-side proxy server may disconnect the non-optimized connection transparently to the client. The client-side proxy server may then establish, transparently to the client, an optimized connection to the requested file server through the selected remote proxy server. In this way, by initially establishing a non-optimized connection and thereafter transparently establishing an optimized connection, the client-side proxy server may immediately service a connection request from the client while at the same time ensuring that when a remote proxy server is eventually found that remote proxy server would be used provide an optimized connection which is to replace the non-optimized connection.

4.0 Implementation Mechanisms—Hardware Overview

Figure 4:
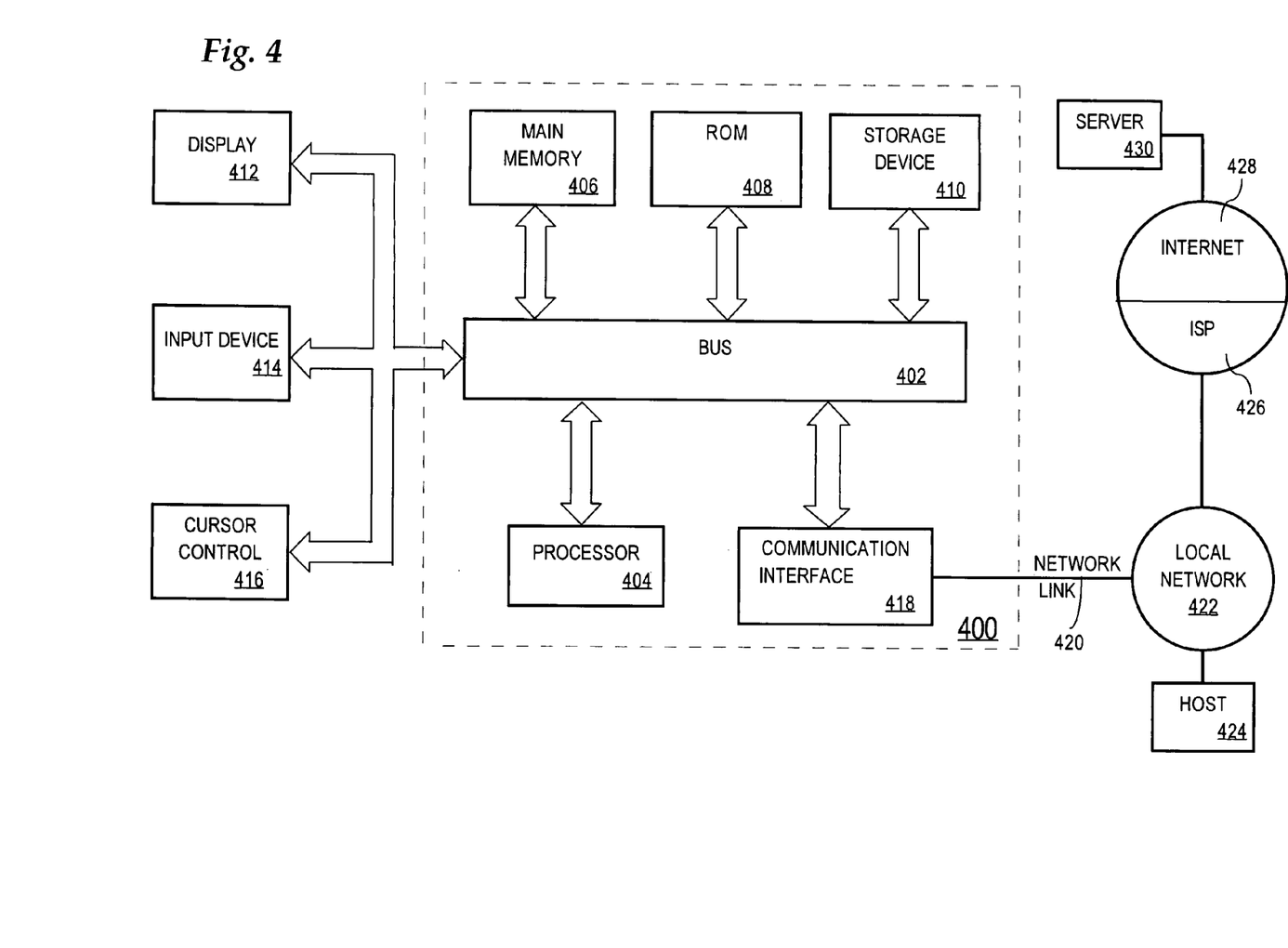
FIG. 4 illustrates a computer system.

FIG. 4 is a block diagram that illustrates a computer system 400 upon which embodiments of the techniques for automatic proxy registration and discovery and for using automatic proxy registrations in a multi-proxy communication system may be implemented. A preferred embodiment of the techniques described herein may be implemented by using one or more computer programs running on a network device or appliance, such as computer system 400, that is communicatively connected and/or operatively coupled to a network infrastructure element, such as a router or a switch.

Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The techniques described herein are related to the use of computer system 400 in a multi-proxy communication system for automatic proxy registration and discovery and/or for using automatic proxy registrations. According to one embodiment, automatic proxy registration and discovery and/or using automatic proxy registrations is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the techniques described herein for automatic proxy registration and discovery and for using automatic proxy registrations. Thus, embodiments of the techniques described herein are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the techniques described herein, one such downloaded application provides for automatic proxy registration and discovery and for using automatic proxy registrations in a multi-proxy communication system as described herein.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

In the foregoing specification, the present techniques for automatic proxy registration and discovery for using automatic proxy registrations have been described with reference to specific embodiments thereof. It will, however, be evident that various modifications and changes may be made thereto without departing from the broader spirit and scope of the present techniques. For example, the techniques described herein may be used in any operational context that provides dual-side proxy servers in the communication path between remote network entities that need to communicate with each other. The specification and drawings are, accordingly, to be regarded in an illustrative rather than a restrictive sense.

What is claimed is:

1. An apparatus comprising:
one or more processors;
a proxy server that provides local servers of a Local Area Network (LAN) with optimized connections to clients in remote networks through remote proxy servers, wherein the remote proxy servers are communicatively connected to the proxy server over a Wide Area Network (WAN);
wherein the proxy server and the local servers of the LAN are separated from the clients in the remote networks and the remote proxy servers by the WAN; and
one or more stored sequences of instructions which, when executed by the one or more processors, cause the proxy server to perform operations comprising:
receiving a discovery request that is broadcast to a plurality of proxy servers by a remote proxy server;
in response to receiving the discovery request that is broadcast to the plurality of proxy servers by the remote proxy server, automatically discovering a file server, of the local servers, that is communicatively connected to the proxy server over the LAN;
in response to automatically discovering the file server, creating an association record corresponding to the file server, wherein the association record identifies the file server and the proxy server and indicates that the proxy server is configured to provide the remote proxy servers with optimized connections to the file server; and before the proxy server provides the remote proxy servers with optimized connections, registering the association record with a centralized database server, wherein the proxy server and the remote proxy servers are communicatively connected to the centralized database server over the WAN;

after registering the association record with the centralized database server, establishing an optimized connection with a remote proxy server to the file server, wherein the remote proxy server selects the proxy server from the plurality of proxy servers based on the association record registered with the centralized database server.

2. The apparatus of claim 1, wherein:
the file server is one of a plurality of file servers that are communicatively connected to the proxy server over the LAN; and
the one or more stored sequences of instructions further comprise instructions which, when executed by the one or more processors, cause:
automatically discovering each of the plurality of file servers;
creating a plurality of association records corresponding to the plurality of file servers, wherein each association record identifies a corresponding file server of the plurality of file servers and the proxy server and indicates that the proxy server is configured to provide the remote proxy servers with optimized connections to the corresponding file server; and
registering each of the plurality of association records with the centralized database server.

3. The apparatus of claim 1, wherein prior to establishing the optimized connection with the remote proxy server to the file server, the remote proxy server has connected to the file server through a non-optimized connection.

4. The apparatus of claim 1, wherein the instructions that cause automatically discovering the file server further comprise instructions which, when executed by the one or more processors, cause:
sending a request to determine a name of a site to which the file server belongs;
receiving a response that includes the name of the site to which the file server belongs;
based on the name of the site, determining whether the file server and the proxy server belong to the same site; and
creating the association record and registering the association record with the centralized database server only when the file server and the proxy server belong to the same site.

5. The apparatus of claim 1, wherein:
the association record further includes a proximity metric that indicates, at any given time, how fast any connection between the proxy server and the file server would be; and
the one or more stored sequences of instructions further comprise instructions which, when executed by the one or more processors, cause:
periodically determining values of the proximity metric based on measurements reflecting the network load between the proxy server and the file server; and
sending the values of the proximity metric to the centralized database server;
wherein the centralized database server is operable to periodically update the association record with the received values of the proximity metric and, based on a current value of the proximity metric, to periodically determine whether to deactivate the association record.

6. An apparatus comprising:
one or more processors;
a proxy server that provides local clients of a first Local Area Network (LAN) with optimized connections to servers in one or more remote networks through a plurality of remote proxy servers, wherein the plurality remote proxy servers are communicatively connected to the proxy server over a Wide Area Network (WAN);
wherein the proxy server and the local clients of the first LAN are separated from the servers in the one or more remote networks and the plurality of remote proxy servers by the WAN; and
one or more stored sequences of instructions which, when executed by the one or more processors, cause the proxy server to perform operations comprising:
receiving, from a client of the local clients, a request to connect to a file server, of the servers, that is communicatively connected to the proxy server over the WAN, wherein the client is communicatively connected to the proxy server over the first LAN;
in response to receiving the request from the client, sending a discovery request to the plurality of remote proxy servers;
sending a query to a centralized database server to retrieve at least one association record for the file server, wherein the proxy server and the plurality of remote proxy servers are communicatively connected to the centralized database server over the WAN ;
receiving, from the centralized database server, a set of one or more association records, wherein each association record in the set of one or more association records maps a respective remote proxy server of the plurality of remote proxy servers to the file server and indicates that the respective remote proxy server is configured to provide optimized connections to the file server;
in response to receiving the set of one or more association records, selecting, based on the set of one or more association records, a particular remote proxy server, of the plurality of remote proxy servers, that is configured to provide an optimized connection to the file server, wherein the particular remote proxy server is communicatively connected to the file server over a second LAN;
wherein the set of one or more association records are registered with the centralized database server before the optimized connection is provided by the particular remote proxy server to the file server; and
causing the proxy server to establish, through the particular remote proxy server, the optimized connection between the client and the file server.

7. The apparatus of claim 6, wherein the instructions that cause determining the particular remote proxy server further comprise instructions which,
when executed by the one or more processors, cause:
in response to the query, receiving the at least one association record from the centralized database server, wherein the at least one association record indicates at least one remote proxy server that is configured to provide the optimized connection to the file server; and
selecting the particular remote proxy server based on the at least one association record.

8. The apparatus of claim 6, wherein the one or more stored sequences of instructions further comprise instructions which, when executed by the one or more processors, cause:
storing the one or more association records in a cache;

receiving, from a second client, a second request to connect to the file server;

checking the cache to determine whether the cache stores any association records that indicate any remote proxy servers which are configured to provide a second optimized connection to the file server;

locating the one or more association records in the cache;

based on the one or more association records, determining that the particular remote proxy server of the plurality of remote proxy servers is configured to provide the second optimized connection to the file server; and causing the proxy server to establish, through the particular remote proxy server, the second optimized connection between the second client and the file server.

9. The apparatus of claim 6, wherein the one or more stored sequences of instructions further comprise instructions, when executed by the one or more processors, cause:

in response to the query, receiving a message from the centralized database server indicating that there are no association records that indicate any remote proxy servers configured to provide the optimized connection to the file server;

wherein sending the discovery request is performed in response to receiving the message from the centralized database server, wherein the discovery request indicates the file server and instructs the one or more remote proxy servers to determine the nearest remote proxy server to the file server.

10. A multi-proxy communication system comprising:

a first proxy server;

a second proxy server, wherein the first proxy server and the second proxy server are communicatively connected over a Wide Area Network (WAN);

a centralized database server that is communicatively connected to the first proxy server and the second proxy server;

first logic coupled to the first proxy server, wherein the first logic when executed by one or more first processors is operable to:

cause the first proxy server to provide servers local to the first proxy server with optimized connections to clients in one or more remote networks through the second proxy server over the WAN;

cause the first proxy server to receive a discovery request from the second proxy server;

cause the first proxy server to automatically discover, in response to the discovery request received from the second proxy server, one or more file servers, of the servers local to the first proxy server, that are communicatively connected to the first proxy server over a first Local Area Network (LAN);

in response to automatically discovering the one or more file servers, cause the first proxy server to create one or more association records corresponding to the one or more file servers, wherein each of the one or more association records identifies a corresponding file server and the first proxy server and indicates that the first proxy server is configured to provide the second proxy server with optimized connections to the corresponding file server; and cause the first proxy server to register, before providing the second proxy server with optimized connections to the corresponding file server, the one or more association records with the centralized database server; and second logic coupled to the second proxy server, wherein the second logic when executed by one or more second processors is operable to:

cause the second proxy server to receive, from a client, a request to connect to a particular file server of the one or more file servers, wherein the client is communicatively connected to the second proxy server over a second LAN;

cause the second proxy server to send, in response to receiving the request to connect to the particular file server of the one or more file servers, a discovery request to a plurality of proxy servers including the first proxy server;

cause the second proxy server to query the centralized database server to receive at least one association record, wherein the at least one association record indicates at least one remote proxy server that is configured to provide an optimized connection to the particular file server;

based on the at least one association record, cause the second proxy server to select the first proxy server from the plurality of remote proxy servers, wherein the first proxy server configured to provide the optimized connection to the particular file server; and cause the second proxy server to establish, through the first proxy server, the optimized connection between the client and the particular file server.

11. The multi-proxy communication system of claim 10, further comprising a cache in a computer-readable storage medium that is coupled to the second proxy server, wherein the second logic when executed by the one or more second processors is operable to store the at least one association record in the cache and to search through any association records that are stored in the cache.

* * * * *